Figure 1:
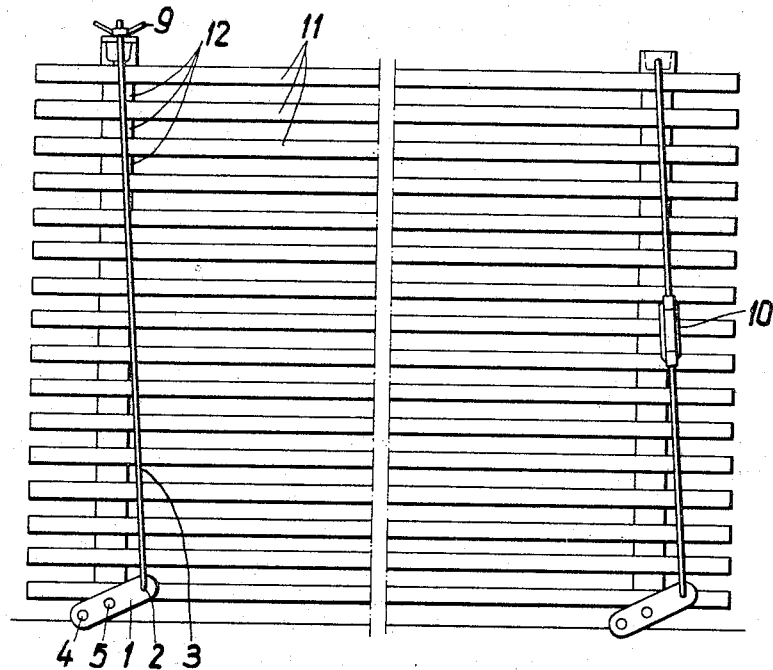

Aug. 22, 1967     O. KREIBAUM     3,337,174
CLAMPING DEVICE FOR PILES OF BOARDS AND PARTICULARLY
PILES OF LUMBER TO BE DRIED
Filed June 21, 1965     4 Sheets-Sheet 1

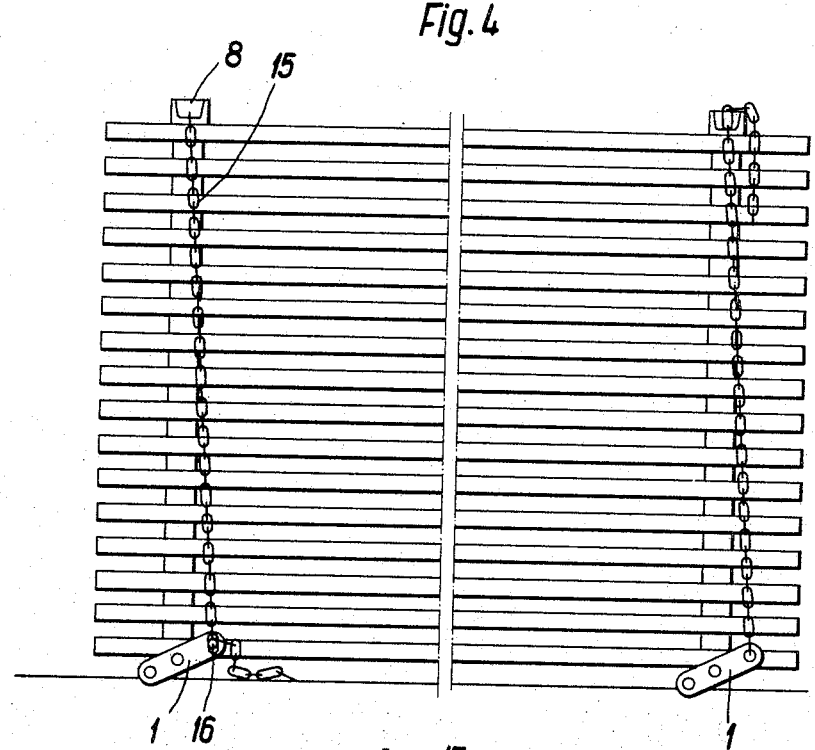
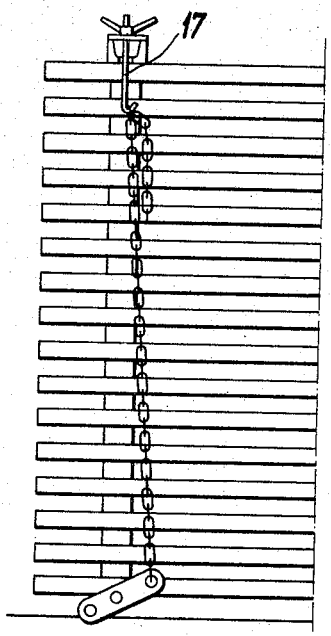

United States Patent Office 3,337,174
Patented Aug. 22, 1967

3,337,174
CLAMPING DEVICE FOR PILES OF BOARDS AND PARTICULARLY PILES OF LUMBER TO BE DRIED
Otto Kreibaum, 193 Muhlenstr., 3215 Lauenstein, Hannover, Germany
Filed June 21, 1965, Ser. No. 465,650
Claims priority, application Germany, July 16, 1964, K 53,488
8 Claims. (Cl. 248—361)

The present invention relates to an apparatus for clamping together piles of boards and particularly piles of lumber to be dried.

In the drying of lumber, particularly in drying chambers, it is necessary, in order to obtain a dependable warp-free quality of board, to clamp the piled articles in such a manner that the clamping force is retained even after the contraction accompanying the drying commences. In order to achieve this result, clamping devices with weights or springs have heretofore been used.

The use of these clamping means is cumbersome. Springs have the additional disadvantage that the clamping force becomes less when the wood shrinks. These disadvantages are avoided by the clamping device in accordance with the present invention.

This device is characterized in particular by the fact that it transfers the weight of the pile itself by means of a lever mechanism or the like to a tensioning means acting between the upper and lower surfaces of the pile so that therefore the clamping force need not be produced by additional force-producing means such as weights or springs, but is applied by the weight of the material to be dried itself.

Theoretically, there are suitable for the transmitting of the weight of the pile itself to the tensioning means, in addition to simple levers, also the most varied types of mechanisms and particularly pulleys or hydraulic devices; however, levers constitute the simplest and most dependable solution. Accordingly, there is preferred an embodiment of the invention in which a double-armed lever is provided, and one outer point of application can be operatively connected with the upper surface and the central point of application with the lower surface of the pile, while the second outer point of application can be connected with the ground or some other support which takes up the load of the pile.

There has proven particularly suitable an embodiment of the invention in which the central point of application of the lever is connected with a pipe or the like extending transverse to it and which can be brought below the pile, one end of the lever being developed as ground support. The weight of the pile rests on the pipe and thus on the central fulcrum of the lever and is transmitted to the ground via the one end of said lever which is developed as a support.

A force corresponding to the ratio of the lever arm lengths acts on the other free end of the lever, and tightens the tensioning means. When the lever arms are of the same length, a force equal to the weight of the pile thus acts in the tensioning means. In this connection, two levers on opposite side of the pile are advisedly connected together to form a pair by the rod seated at the central point of application. The rod must, of course, be of a length which is greater than the width of the pile.

The tensioning means acting between the levers and the upper surface of the pile can advantageously consist of a chain or the like which is conducted over the pile from the free lever end of the one lever to the free lever end of the other lever. Instead of this, there can also be provided a rod, girder or square timber which is placed over the pile and on the ends of which there act the tensioning means raised by the levers.

Means for adjusting the length of the tensioning means such as threaded spindles, chain tighteners or the like are preferably provided so as to be able to adjust the length, whereby the clamping levers are imparted a proper oblique position.

In order to adjust the length of a chain used as tensioning means, a connecting member which permits the connection of any desired chain link can be provided in accordance with the invention at least at one part to which the chain is to be fastened. In this way, it is possible to adjust for the proper chain length even for very different heights of pile.

In accordance with a special feature of the invention, the lever end which is developed as ground support can be equipped with a device for the application of load hoisting means, such as hooks, bolts or the like. In this way, the pile always remains under tension even when it is transported on a crane.

In case of negligent use of the apparatus, it may happen that the tensioning means are so strongly tensioned that the lever arm on which the tensioning means act is exactly vertical. If the lever is a straight lever, the effective lever arm is thereby reduced to zero and thus the tensioning force exerted as a result of the lever action also becomes zero. Furthermore, in case of shrinkage of the pile, it may happen that the lever assumes an oblique position toward the undesired side. This danger is counteracted in accordance with the invention in the manner that the two lever arms do not extend in the same direction, but form a small angle with each other, and therefore are slightly angled with respect to each other.

Even upon very strong tightening of the clamping device, the lever arm acting on the tensioning means can, it is true, be pulled into vertical position, but due to the oblique position of the other lever arm, a certain lever length is still maintained since the point at which it rests on the ground cannot be below the point at which the weight of the pile is transmitted to the rod connected with the lever.

In accordance with a special feature of the invention, the rod can be developed as a flat bar, the axis of the longer cross-section of which forms the lever arm which is in contact with the ground, said axis of the longer cross-section forming an acute angle with the direction of the other lever arm. The lever end acting on the tensioning means is preferably developed as an open hook intended to engage in a chain link. Special devices for clamping the device are unnecessary in most cases.

It has been found particularly advisable for the ratio of the length to the width of the cross-section of the bar to be about 2:1, in which connection the length of the two lever sections (length of the cross-section of the bar and length of the lever placed thereon) are preferably approximately equal.

Figure 2:
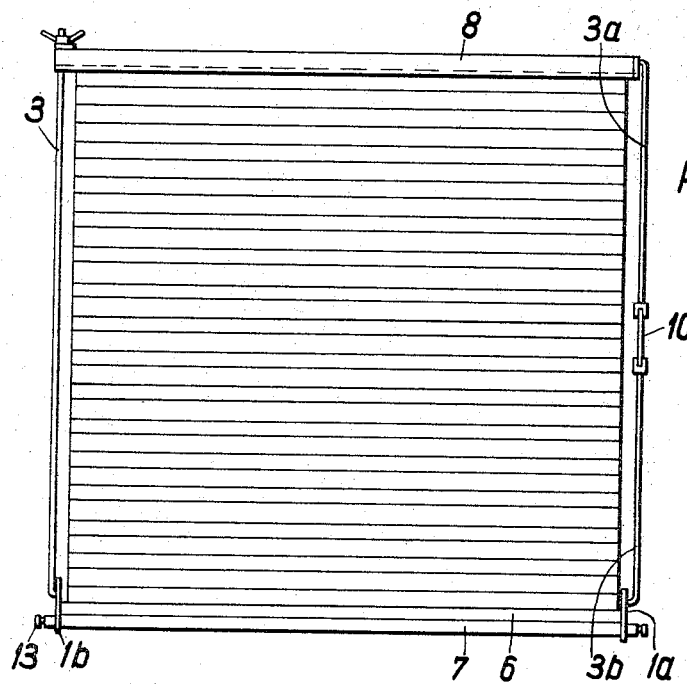
Figure 3:
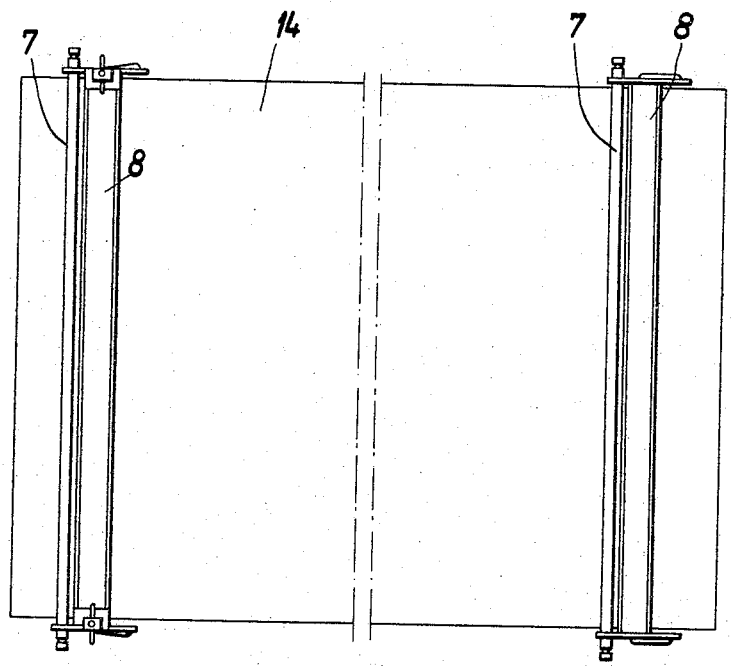
Figure 6:
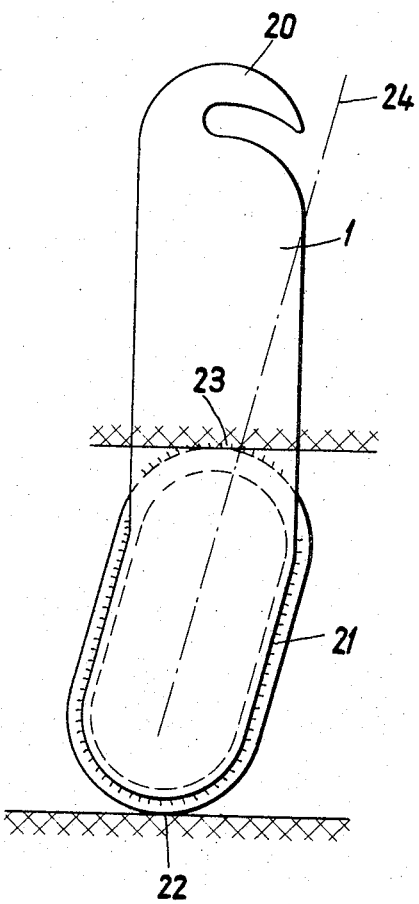

The invention will be described in further detail below with reference to the embodiments shown schematically in the drawing. In the drawing:

FIGS. 1, 2 and 3 show a pile of boards clamped in accordance with the invention, seen in two side views and in top view, FIGS. 4 and 5 show corresponding chain arrangements, and FIG. 6 is an enlarged end view of a lever.

The clamping devices shown in FIGURES 1 to 3 employ bars as tensioning means. On the left hand side of FIG. 1, the bar is seated movably on the right-hand end 2 of the lever 1. The left end 4 of the lever is developed as ground support. The rod 6 which bears the pile of boards is fastened to a central point 5 of the lever.

Tow levers 1a and 1b are connected as a pair by the bars 6 and 7. The pile of boards rests on the bar 6 while the bar 7 rests, as support, on the ground.

Above the pile, there is conducted a rail 8, to each of the ends of which a separate bar 3 is fastened. This bar is equipped with a spindle traction device which in each case, in the case of the embodiments shown to the left in the figures, has the form of a nut 9 threaded on the bar 3, while in the embodiments shown on the right hand side, the bar 3 is divided into two pieces 3a and 3b which can be tightened by the part 10.

Operation in actual practice is effected in the manner that for instance the wood 11 before the drying is placed clean, with the interposition of sticks 12 in suitably sized packages, two bottom pieces of the tensioning device or strong, square timbers being possibly laid at the very bottom. Thereupon the clamping devices are tightened. In this connection, the tensioning means 3 is shortened so that the lever 1 is turned in such a direction that the point 4 is pulled downward and the point 5 upward. The pile is lifted somewhat, whereby the squared timbers become free. The load of the pile which acts via the points 4 and 5 on the lever exerts a moment of rotation on the latter which results in a pulling force in the tensioning means 3 by which the pile is now placed under tension.

By means of suitable transporting devices, for instance a crane, the packages can be taken up and moved under tension. For this purpose, the necessary rope slings or the like are placed around wooden ends 13 provided for this purpose on the lower continuous bar 7.

In FIG. 3, the pile of boards 14 has been merely indicated schematically so that alongside the rail 8 on the top of the pile, the bar 4 which lies below the pile is also visible.

As tensioning means, chains 15 can also be used, as shown in FIGS. 4 and 5. The chains shown in FIG. 4 do not have any tensioning means comparable to the parts 9 and 10 (FIGS. 1 and 2). Nor is this necessary in all cases since with a variable stack height, any desirable chain link which just happens to fit can be hooked in a hook provided at 16 on the lever 1 (FIG. 4, left-hand side). The chain 15 can in this connection be fastened to the rail 8. In the end of the rail 8 a slot can also be cut into which any desired chain link can be inserted and hooked in known manner as shown on the right-hand side of FIG. 4.

The clamping device is in this connection applied in the manner that the pile which is built up on strong square timbers and on which the device has been applied at first relatively loosely but with the levers 1 already oblique, is lifted by a crane and set down again without the square timbers lying below, so that its weight is now transmitted by the levers 1 to the ground.

If the possibility of adjustment of the length of the tensioning means obtainable in accordance with FIG. 4 is not sufficiently precise, further clamping means for the tensioning means enter into consideration, for example a spindle device 17, as shown in FIG. 5. The corresponding spindle is provided at its lower end with a hook on which any desired chain link can be hooked. Any desired other known chain clamping devices can also be used for this purpose.

It is clear that the apparatus can be subjected to various modifications in order to achieve its purpose. For example, the bars 6 and 7 by which the levers 1a and 1b (FIG. 2) are connected can be replaced by a single flat rail. The bar 7 can also be omitted entirely. Instead of it, foot surfaces can if necessary be provided on the supporting ends of the levers 1.

FIG. 6 shows an embodiment of a lever having lever arms at an angle to each other, the lower lever arm being formed by a flat bar 21.

The bar 21 is seated at the point 22 on the support. This point is displaced laterally from the point 23 at which the pile of boards contacts the bar 21, even if the lever 1 is vertical, as is assumed in the drawing.

The lever 1 is developed at its end as a hook 20 the opening of which faces the extension 24 of the axis of the longer cross-section of the bar 21.

The angle which the lever 1 forms with the axis 24 is about 20° in the case of the embodiment shown in the drawing. The lever sections, i.e., on the one hand the distance between the points 22 and 23 and on the other hand the distance between the point 23 and the hook cut-out are approximately equal.

It will be understood that this invention is not limited to the specific modifications or embodiments described above and illustrated in the drawings and may be carried out with various modifications within the scope of the appended claims.

What is claimed is:

1. Apparatus for clamping together a pile of boards, such as a pile of lumber to be dried, on a supporting surface, comprising an upper transverse bar member extending across the top of the pile, a lower transverse bar member extending transversely under the pile in cooperative relation with the upper bar member, said lower bar member having one side adapted to rest on the supporting surface and an opposite side in contact with the underside of the pile and said lower bar member having opposing ends adjacent the sides of the pile, levers formed of the elongated cross-sectional profile of the ends of the lower bar member, lever arms rigidly connected with the levers and extending upwardly therefrom and pulling means connected between the lever arms and the upper bar member.

2. The invention of claim 1, wherein the levers and the lever arms are disposed in angular relationship relative to the longitudinal axis of the lower bar member.

3. The invention of claim 1, wherein said lever arms are provided on their terminal ends with hook means for engagement with said pulling means.

4. The invention of claim 3, wherein said pulling means is constituted by chains with the hook means being selectively engageable with any desired link of the chains.

5. The invention of claim 1, wherein the ratio of length to width of the cross-section of the lower bar member corresponds to 2:1.

6. The invention of claim 1, wherein the effective lengths of the levers and the lever arms are approximately equal.

7. The invention of claim 1, wherein the ends of the lower bar member are provided with means for engaging a load lifting means.

8. The invention of claim 1, wherein said pulling means is provided with adjustable tensioning means.

References Cited

UNITED STATES PATENTS 3,204,983  9/1965  Rehnstrom et al. ____ 280—179
3,227,405  1/1966  Layton _____ 248—44

ROY D. FRAZIER, *Primary Examiner.*

JOHN PETO, *Examiner.*